(12) United States Patent
Mori et al.

(10) Patent No.: US 7,484,683 B2
(45) Date of Patent: Feb. 3, 2009

(54) WEBBING RETRACTOR

(75) Inventors: Shinji Mori, Niwa-gun (JP); Teruhiko Koide, Niwa-gun (JP); Fuminori Komiya, Niwa-gun (JP); Takuhiro Saito, Niwa-gun (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 269 days.

(21) Appl. No.: 10/757,546

(22) Filed: Jan. 15, 2004

(65) Prior Publication Data
US 2004/0182963 A1   Sep. 23, 2004

(30) Foreign Application Priority Data
Jan. 15, 2003 (JP) ............................. 2003-006978
Jul. 4, 2003 (JP) ............................. 2003-192121

(51) Int. Cl.
*B60R 22/46* (2006.01)
(52) U.S. Cl. .................................................... 242/374
(58) Field of Classification Search ................. 242/374, 242/382, 390.8, 379; 297/475, 476, 477, 297/478
See application file for complete search history.

(56) References Cited

U.S. PATENT DOCUMENTS

| | | | | |
|---|---|---|---|---|
| 3,315,914 A | * | 4/1967 | Turner | 242/390.1 |
| 3,389,873 A | * | 6/1968 | Filippi et al. | 242/374 |
| 4,191,344 A | | 3/1980 | Tillac | |
| 4,445,604 A | * | 5/1984 | Rogers, Jr. | 192/71 |
| 4,489,804 A | * | 12/1984 | Kamijo | 180/268 |
| 4,558,832 A | * | 12/1985 | Nilsson | 242/374 |
| 4,570,872 A | * | 2/1986 | Tsujimura et al. | 242/390.8 |
| 4,579,294 A | * | 4/1986 | Sakakibara et al. | 242/372 |
| 4,787,569 A | * | 11/1988 | Kanada et al. | 242/371 |

FOREIGN PATENT DOCUMENTS

| | | |
|---|---|---|
| EP | 0 893 313 A2 | 1/1999 |
| EP | 1 382 498 A2 | 1/2004 |
| JP | 58-195573 A | 11/1983 |
| JP | 64-22654 A | 1/1989 |

* cited by examiner

*Primary Examiner*—Peter M Cuomo
*Assistant Examiner*—Scott Haugland
(74) *Attorney, Agent, or Firm*—Roberts Mlotkowski Safran & Cole, P.C.; Thomas W. Cole

(57) ABSTRACT

A webbing retractor for an elongated, strip-shaped webbing belt used for application to a body of a vehicle occupant riding in a vehicle. The webbing retractor has: a frame in which a pair of leg plates, which are disposed so as to face one another, are connected by a back plate so as to be integral; a spool which is disposed between the pair of leg plates, one end of the webbing belt being anchored to the spool; a driving mechanism which is disposed between the pair of leg plates and has an output shaft and which is for rotating the spool in at least a take-up direction; and a clutch disposed between the pair of leg plates, transmitting rotation of the output shaft to the spool. Because a motor and gears can be disposed between the leg plates of the frame, the webbing retractor can be made compact.

16 Claims, 7 Drawing Sheets

WEBBING RETRACTOR

CROSS-REFERENCE TO RELATED APPLICATIONS

This application claims priority under 35 USC 119 from Japanese Patent Applications No.2003-6978 and No.2003-192121, the disclosures of which are incorporated by reference herein.

BACKGROUND OF THE INVENTION

1. Field of the Invention

The present invention relates to a webbing retractor which structures a seat belt device for restraining, by an elongated, strip-shaped webbing belt, the body of a vehicle occupant who is seated in a seat of a vehicle or the like.

2. Description of the Related Art

A seat belt device which restrains, by an elongated, strip-shaped webbing belt, the body of a vehicle occupant who is seated in a seat of a vehicle, is equipped with a webbing retractor which is fixed to the vehicle body at the side of the seat. The webbing retractor has a spool whose axial direction runs, for example, substantially along the longitudinal direction of the vehicle. The proximal end side, in the longitudinal direction, of the webbing belt is anchored at the spool. The spool can take up the webbing belt in the form of a roll around the outer peripheral portion of the spool. When the seat belt device is not being used, the webbing belt can be taken-up and accommodated on the outer peripheral portion of the spool.

An urging member, such as a spiral spring or the like which urges the spool in a take-up direction in which the spool takes up the webbing belt, is provided at the webbing retractor. Due to the urging force of this urging member, the webbing belt is taken up and accommodated. In the state in which the webbing belt is applied to the body of a vehicle occupant, slack or the like of the webbing belt is eliminated by the urging force of the urging member.

On the other hand, a mechanism has been conceived of which, when the vehicle rapidly decelerates or the like, takes-up a given amount of the webbing belt onto the spool, so as to eliminate the slight looseness called "slack", and increase the force by which the webbing belt restrains the body of the vehicle occupant, and even more reliably hold the body of the vehicle occupant. In this type of mechanism, generally, the state of rapid deceleration of the vehicle is detected by an acceleration sensor, and the driving force of a driving mechanism, such as a motor or the like, forcibly rotates the spool in the take-up direction on the basis of an electric signal from the acceleration sensor (refer to the Japanese Patent Application Laid-Open No. 2001-347923 as an example of a so-called "motor retractor").

In contrast, a structure has been thought of in which the distance to another vehicle or an obstacle ahead is detected by a distance sensor or the like. When the distance to the vehicle or the obstacle ahead is less than a given value, a motor is operated, and the spool is rotated in the take-up direction by the torque of the motor.

Incidentally, in the case of the above-described motor retractor, a structure, in which a clutch is interposed between the output shaft of a motor and a spool and only the rotation from the output shaft side is transmitted to the spool by this clutch, is adopted in order to prevent the transmission of the rotation from the spool side to the motor.

However, in motor retractors which have been used until now, the clutch is disposed at the outer side of the frame and at the side of one leg plate of the pair of leg plates which structure the frame. Therefore, in a case in which the output shaft of the motor is connected to the clutch, the motor must be disposed at the side of the leg plate at which the clutch is provided, which side is opposite the side at which the other leg plate is disposed, i.e., the motor must be disposed at the side of the leg plate and at the outer side of the frame, or must be disposed further toward the top of the frame or the bottom of the frame than the pair of leg plates. In the case of such a structure, the motor retractor itself becomes large due to the parts which are relatively heavy, such as the motor, being positioned at the outer side of the frame, or above or below the frame. There is therefore the disadvantage that the overall balance of weight of the motor retractor is poor.

SUMMARY OF THE INVENTION

In view of the aforementioned, in accordance with the present invention, it is possible to obtain a webbing retractor in which a spool can be rotated by a driving mechanism such as a motor or the like, and which is compact and has a good balance of weight.

A first aspect of the present invention is a webbing retractor for an elongated, strip-shaped webbing belt used for application to a body of a vehicle occupant riding in a vehicle, the webbing retractor comprising: a frame in which a pair of leg plates, which are disposed so as to face one another, are connected by a back plate so as to be integral; a spool, which is disposed between the pair of leg plates and held directly or indirectly to the frame so as to be rotatable around an axis, one end of the webbing belt being anchored to the spool, the spool being for winding of the webbing belt therearound; a driving mechanism, which is disposed between the pair of leg plates and has an output shaft and which is for rotating the spool in at least a take-up direction by driving the output shaft to rotate in a predetermined direction; and a clutch disposed between the pair of leg plates, and mechanically interposed between the output shaft and the spool, and transmitting rotation of the output shaft to the spool.

In accordance with the webbing retractor having the above-described structure, the webbing belt is set in a state of being applied to the body of a vehicle occupant by the vehicle occupant sitting down in a seat of the vehicle, and applying the webbing belt around his/her body, e.g., by the vehicle occupant engaging a tongue plate, which is provided at the webbing belt, with a buckle device.

When, for example, while the vehicle is traveling, an obstacle exists ahead of the vehicle and the driving of the driving mechanism starts at least due to the interval between the vehicle and the obstacle (the distance from the vehicle to the obstacle) reaching within a predetermined range and the output shaft of the driving mechanism thereby being rotated in one direction around the axis thereof, this rotation is transmitted to the spool via the clutch, and rotates the spool in the take-up direction. Due to the spool being rotated in the take-up direction in this way, the webbing belt is taken-up onto the spool from the proximal end side thereof. The slight looseness (so-called "slack") in the webbing belt which is applied to the vehicle occupant is eliminated, and the ability of the webbing belt to restrain the body of the vehicle occupant can be improved.

In the webbing retractor relating to the present invention, the clutch is disposed between the pair of leg plates which structure the frame for supporting the spool. By disposing the clutch substantially between the pair of leg plates in this way, the driving mechanism can be disposed between the pair of leg plates. Therefore, the present webbing retractor can be made compact on the whole as compared with a structure in which the driving mechanism is disposed at the side of one leg plate opposite the side thereof at which the other leg plate is disposed, i.e., a structure in which the driving mechanism is disposed at the outer side of the frame.

Moreover, as compared with a structure in which the driving mechanism is disposed at the outer side of the frame, by making it possible to position the driving mechanism between the pair of leg plates as described above, the overall balance of weight of the webbing retractor can be set near the center in the direction in which the leg plates face one another, and the webbing retractor can be made stable in terms of the weight thereof.

By disposing the clutch between the pair of leg plates as described above, the driving mechanism can be disposed between the pair of leg plates. Therefore, the driving mechanism and the clutch can be set close to one another. In this way, even in the case of a structure in which the clutch and the output shaft of the driving mechanism are mechanically connected by a driving force transmitting mechanism such as a decelerating mechanism or the like, the structure of the driving force transmitting mechanism such as a decelerating mechanism or the like can be simplified. For this reason as well, the webbing retractor can be made compact, and the cost thereof can be reduced.

Because parts which are relatively heavy, such as the driving mechanism, can be disposed between the pair of leg plates, it is possible to, as needed, support the driving mechanism not just at one of the leg plates or the back plate connecting the leg plates, but at two of or all of the pair of leg plates and the back plate connecting the leg plates. In this way, there is no particular need to improve strength in order to support the driving mechanism. As a result, the webbing retractor can be made to be more light-weight, and the cost thereof can be reduced.

In a case in which the clutch of the first aspect of the present invention has: a first rotating body which rotates due to rotation of the output shaft; a second rotating body which is provided coaxially and integrally with the spool, and which is for transmitting rotation to the spool by receiving rotation of the first rotating body; and a transmitting member transmitting the rotation of the first rotating body to the second rotating body, when the driving of the driving mechanism starts and the output shaft rotates, the rotation of the output shaft is transmitted to the first rotating body structuring the clutch, and the first rotating body rotates. When the first rotating body rotates, the transmitting member approaches one rotating body among the first rotating body and the second rotating body, and engages with the one rotating body.

Here, because the transmitting member can rotate integrally together with the other rotating body, rotation is transmitted from the first rotating body to the second rotating body via the transmitting member in a state in which the transmitting member is engaged with one rotating body. In this way, the rotation of the output shaft is transmitted to the spool.

On the other hand, in the webbing retractor relating to the present invention, the clutch is provided between the pair of leg plates which structure the frame, and the second rotating body, which structures the clutch, is provided coaxially and integrally with the spool. Therefore, the rotation of the second rotating body can be directly transmitted to the spool. In this way, when the driving mechanism drives, the spool can be rotated smoothly.

The webbing retractor of the present invention may further comprise a driving force transmitting mechanism to transmit the driving force of the driving mechanism to the clutch, the driving force transmitting mechanism including: an output shaft side rotating member connected directly or indirectly to the output shaft and provided so as to be attachable to and detachable from the output shaft; and a clutch side rotating member provided so as to be attachable to and detachable from a predetermined attachment position at which the clutch side rotating member can engage directly or indirectly with the output shaft side rotating member.

According to such a structure, the output shaft side rotating member is attached to the output shaft of the driving mechanism, or to an output shaft side shaft member which rotates interlockingly with the output shaft. When the output shaft rotates due to the driving force of the driving mechanism, the output shaft side rotating member rotates.

On the other hand, the clutch side rotating member is provided at a predetermined attachment position at which the clutch side rotating member can engage directly or indirectly with the output shaft side rotating member. When the output shaft side rotating member rotates, the clutch side rotating member, which is engaged directly or indirectly with the output shaft side rotating member, rotates, and the rotation of the clutch side rotating member is transmitted to the clutch.

Due to the clutch transmitting to the spool the rotation received from the clutch side rotating member, the spool rotates. If the direction of rotation of the spool is the take-up direction, the webbing belt is taken-up, and the slight looseness or so-called "slack" of the webbing belt applied to the vehicle occupant is eliminated, and the ability of the webbing belt to restrain the body of the vehicle occupant can be improved.

The clutch side rotating member in the webbing retractor relating to the present invention can be made to rotate at a rotational speed corresponding to the rotational peripheral speed of the output shaft side rotating member. Moreover, the output shaft side rotating member is attached to the output shaft or the output shaft side shaft member so as to be attachable thereto and detachable therefrom. The clutch side rotating member is attached to the aforementioned predetermined attachment position so as to be attachable thereto and detachable therefrom.

Accordingly, by changing to an output shaft side rotating member or a clutch side rotating member whose outer diameter and the like differ within a range which allows engagement of the output shaft side rotating member and the clutch side rotating member, the gear ratio at the driving force transmitting mechanism, which is structured to include the output shaft side rotating member and the clutch side rotating member, is changed. Accordingly, by appropriately selecting the output shaft side rotating member and the clutch side rotating member, the rotational speed transmitted to the clutch at the time when the driving mechanism drives, and accordingly the rotational speed of the spool, can easily be set.

The webbing retractor of the present invention may further comprise a driving force transmitting mechanism to transmit the driving force of the driving mechanism to the clutch, the driving force transmitting mechanism including: an output shaft side rotating member connected to the output shaft directly or indirectly; and a clutch side rotating member provided at a predetermined attachment position at which the clutch side rotating member can engage directly or indirectly with the output shaft side rotating member, wherein a rotating ratio of the output shaft side rotating member in relation to the clutch side rotating member is changeable.

The present invention is not limited to such a mode, provided that the output shaft side rotating member and the clutch side rotating member are structured such that rotation can be transmitted from the output shaft side rotating member to the clutch side rotating member. For example, the output shaft side rotating member and the clutch side rotating member may be gears which are connected together by meshing together or by a gear belt or a chain or the like being engaged with both. Or, the output shaft side rotating member and the clutch side rotating member may be pulleys which are connected together by an endless belt being trained therearound.

The webbing retractor of the present invention may be a webbing retractor, wherein: the output shaft side rotating member is an output shaft side gear which is coaxially connected to the output shaft, and which, in a state of being attached to the output shaft, rotates due to rotation of the output shaft; and the clutch side rotating member is a clutch side gear which, in a state of being attached to the attachment position, meshes with the output shaft side gear, and receives the rotation of the output shaft side gear so as to rotate, and transmits said rotation to the clutch.

The output shaft side gear, which serves as the output shaft side rotating member, is attached coaxially to the output shaft of the driving mechanism. The clutch side gear, which serves as the clutch side rotating member, is attached to the predetermined attachment position and meshes with the output shaft side gear.

When the driving mechanism drives and the output shaft rotates, the output shaft side gear rotates integrally with the output shaft. Moreover, due to the output shaft side gear rotating, the clutch side gear, which meshes with the output shaft side gear, rotates, and this rotation is transmitted to the clutch.

Here, the output shaft side gear can be freely attached to and detached from the output shaft. Further, the clutch side gear can be freely attached to and detached from the predetermined attachment position. Accordingly, by changing the gear specifications such as the numbers of teeth, the pitch circles, or the like within a range in which the output shaft side gear and the clutch side gear can mesh with one another, the gear ratio (reduction ratio) from the driving mechanism to the clutch can be easily changed and set.

The driving force transmitting mechanism may be structured to further comprise a worm gear which is provided coaxially with the clutch side gear, wherein the worm gear transmits the driving force to the clutch. When a worm gear is used, the reduction ratio can be extremely large compared with the case in which a spur gear is used. Therefore, the driving force of a motor can be reduced and transmitted to the clutch without using a lot of gears.

When the side opposite the back plate of the frame is an open portion and the driving force transmitting mechanism is provided in the open portion, assembling and replacement of the gears are facilitated.

Note that, in the present invention, the attachment positions (mounting positions) of the above-described both gears (the output shaft side gear and the clutch side gear) are not particularly limited. However, in consideration of rigidity and the like, a gear housing may be mounted to the frame, and the both gears can be rotatably accommodated in the gear housing in a state in which they mesh with one another. Moreover, such a gear housing has the advantage that, by utilizing a structure in which, for example, the gear housing is provided at the outer side of the frame and the both gears mesh with one another at the outer side of the frame, the work for assembling the gears and the work for replacing the gears during repair or the like are facilitated.

DETAILED DESCRIPTION OF THE INVENTION

Embodiments of the present invention will be described hereinafter with reference to the drawings.

STRUCTURE OF FIRST EMBODIMENT

Figure 1:
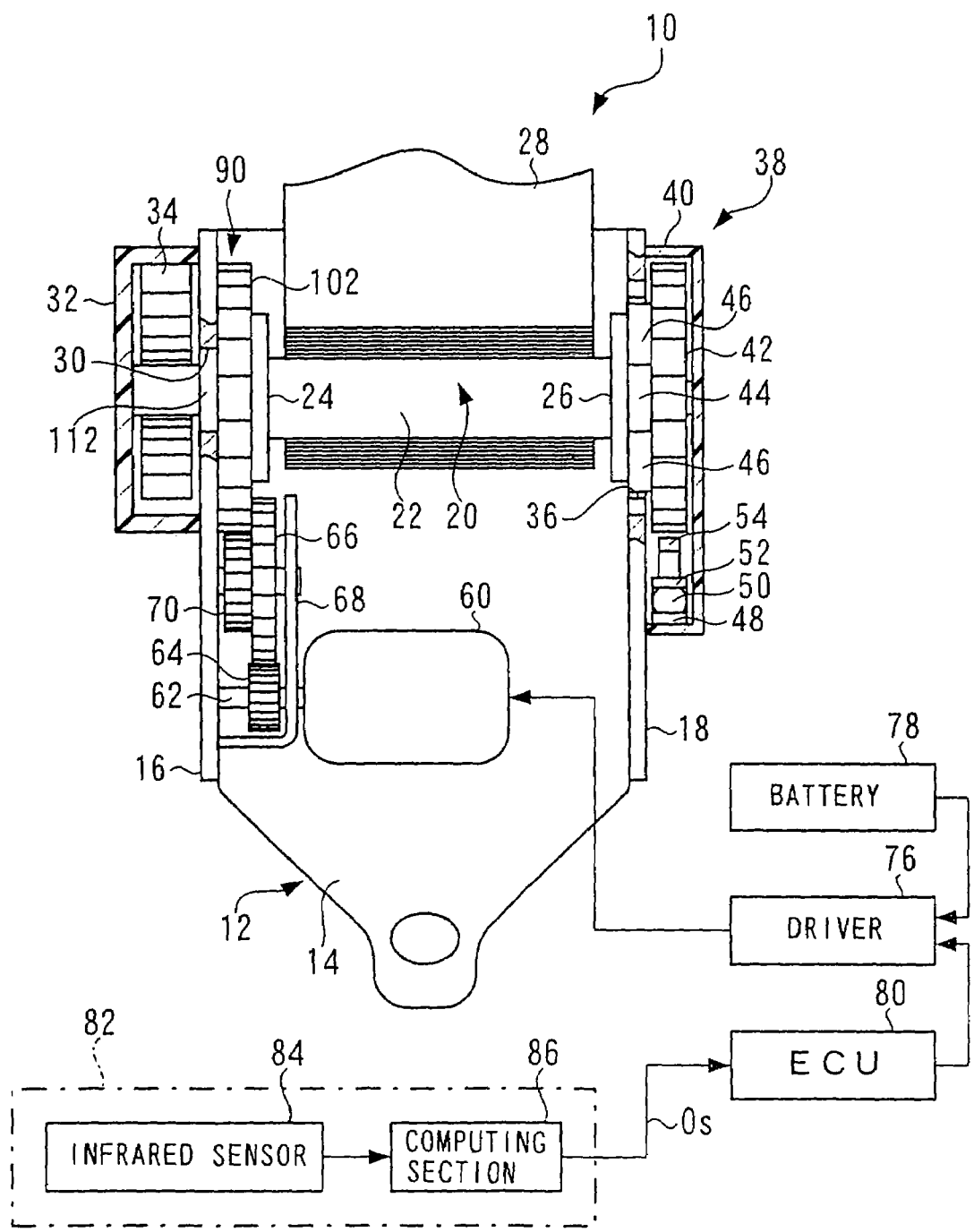
FIG. 1 is a front view summarily showing the overall structure of a webbing retractor relating to a first embodiment of the present invention.

The overall structure of a webbing retractor 10 relating to a first embodiment of the present invention is summarily shown in a front sectional view in FIG. 1.

As shown in FIG. 1, the webbing retractor 10 has a frame 12. The frame 12 has a back plate 14 which is substantially plate-shaped. The webbing retractor 10 is mounted to a vehicle body by the back plate 14 being fixed to the vehicle body by unillustrated fasteners such as bolts or the like. A pair of leg plates 16, 18 extend parallel to one another from the transverse direction ends of the back plate 14. A spool 20, which serves as a take-up shaft and which is manufactured by die casting or the like, is disposed rotatably between the leg plates 16, 18.

The spool 20 is constituted by a spool main body 22 and a pair of flange portions 24, 26. The spool main body 22 is substantially hollow and cylindrical. The pair of flange portions 24, 26 are formed in substantial disc shapes at the end portions of the spool main body 22 and the spool 20 is in the shape of a drum as a whole.

The proximal end portion of a webbing belt 28, which is formed in the shape of an elongated strip, is fixed between the flange portions 24, 26. When the spool 20 is rotated in one direction (hereinafter, for convenience of explanation, this direction will be called the "take-up direction") around the axis thereof, the webbing belt 28 is taken-up in the form of a roll onto the outer peripheral portion of the spool main body 22 from the proximal end side of the webbing belt 28. Further, if the webbing belt 28 is pulled from the distal end side thereof, the webbing belt, which is taken-up on the outer peripheral portion of the spool main body 22, is pulled out. Accompanying this, the spool 20 rotates in the direction opposite to the direction of rotation at the time of taking-up the webbing belt 28 (hereinafter, for convenience of explanation, the direction of rotation of the spool 20 at the time of taking-up the webbing belt 28 is pulled out will be called the "pull-out direction".)

The flange portion 24 one end side of the spool 20, which is at the side opposite from the flange portion 26 side of the spool 20, passes substantially coaxially through a circular hole 30 which is formed in the leg plate 16, and projects to the exterior of the frame 12. A case 32 is disposed at the outer side of the frame 12 at the leg plate 16 side. The case 32 is disposed so as to oppose the leg plate 16 along the axial direction of the spool 20, and is fixed to the leg plate 16. The case 32 is, on the whole, open toward the leg plate 16 side. The one end side of the spool 20 which passes through the circular hole 30 enters into the inner side of the case 32, and is rotatably supported by the case 32.

Moreover, a spiral spring 34 is disposed within the case 32. The end portion, at the outer side in the direction of the spiral, of the spiral spring 34 is anchored on the case 32. The end portion, at the inner side in the direction of the spiral, of the spiral spring 34 is anchored on the spool 20. When the spool 20 is rotated in the pull-out direction from a neutral state in which no particular load is applied, urging force in the take-up direction arises, and the spiral spring 34 urges the spool 20 in the take-up direction. Accordingly, basically, when the tensile force applied to the webbing belt 28 for pulling the webbing belt 28 out from the spool 20 is released, the urging force of the spiral spring 34 rotates the spool 20 in the take-up direction, and the webbing belt 28 is taken-up onto the spool 20.

On the other hand, the flange portion 26 side other end side of the spool 20, which is opposite the flange portion 24 side thereof, passes substantially coaxially through an internal teeth ratchet hole 36 formed in the leg plate 18, and projects at the exterior of the frame 12. A lock mechanism 38 is provided at the outer side of the frame 12 at the leg plate 18 side. The lock mechanism 38 has a case 40. The case 40 is disposed so as to oppose the leg plate 18 along the axial direction of the spool 20, and is fixed to the leg plate 18.

A ratchet gear 42 structuring the lock mechanism 38 is accommodated at the inner side of the case 40 so as to be coaxial with and so as to be able to rotate relative to the spool 20. The ratchet gear 42 is formed in the shape of a cylinder having a shallow floor whose side opposite the leg plate 18 in the axial direction is open. Ratchet teeth are formed at the outer peripheral portion of the ratchet gear 42.

A lock base 44 is accommodated at the inner side of the ratchet gear 42. The lock base 44 is provided coaxially with and integrally with the spool 20, and accordingly, rotates integrally with the spool 20 due to rotation of the spool 20. An unillustrated urging mechanism, such as a compression coil spring or the like, is provided at the lock base 44. A portion of the urging mechanism is engaged with the ratchet gear 42. When the lock base 44 rotates, the urging mechanism rotates together with the lock base 44 and applies urging force along the direction of rotation thereof to the ratchet gear 42.

Therefore, although the ratchet gear 42 is originally able to rotate relative to the spool 20, due to the lock base 44 rotating integrally with the spool 20, the ratchet gear 42 rotates following the rotation of the spool 20 due to the urging force applied from the urging mechanism.

On the other hand, lock plates 46 are supported at the lock base 44, at the inner side of the ratchet hole 36. The lock plates 46 can approach and move away from the internal teeth of the ratchet hole 36 in a state in which the lock plates 46 are supported at the lock base 44. Further, the lock plates 46 are engaged with the ratchet gear 42 and therefore, when the ratchet gear 42 rotates in the take-up direction relative to the lock base 44, interlockingly with this rotation, the lock plates 46 approach the internal teeth of the ratchet hole 36, and mesh with the internal teeth of the ratchet hole 36.

Further, a sensor frame 48 is disposed at the lower side, in the radial direction, of the ratchet gear 42. The sensor frame 48 has an unillustrated placement portion which is curved at a predetermined curvature and which opens upward. A sensor ball 50 is placed on this placement portion. Moreover, an engaging plate 52 is provided above the sensor ball 50. The engaging plate 52 is mounted to the sensor frame 48 so as to be able to rotate up and down. When the sensor ball 50 rolls on the placement portion and is displaced upward, the engaging plate 52 is pressed from below by the sensor ball 50 and rotates.

Moreover, an engaging claw 54 is formed at the engaging plate 52. The distal end of the engaging claw 54 opposes the ratchet teeth of the ratchet gear 42. When the engaging plate 52 rotates upward, the engaging claw 54 meshes with a ratchet tooth of the ratchet gear 42 so as to restrict rotation of the ratchet gear 42.

On the other hand, a motor 60 serving as a driving mechanism is disposed between the leg plate 16 and the leg plate 18, and beneath the spool 20. A gear 64 is provided coaxially and integrally with an output shaft 62 of the motor 60.

A gear 66, whose diameter is larger than that of the gear 64, is disposed at the upper side, in the radial direction, of the gear 64. The gear 66 meshes with the gear 64 in a state in which the gear 66 is pivotally supported so as to be able to freely rotate around an axis which is parallel to the spool 20, by the leg plate 16 and a supporting plate 68 which is provided between the leg plates 16, 18. A gear 70, whose diameter is smaller than that of the gear 66, is provided at a side, in the axial direction, of the gear 66 so as to be coaxial and integral with the gear 66.

A clutch 90 is provided at the radial direction upper side of the gear 70 between the flange portion 24 of the spool 20 (i.e., the end portion of the spool 20 at the leg plate 16 side thereof) and the leg plate 16 (i.e., the clutch 90 is provided between the leg plate 16 and the leg plate 18, or, in other words, at the inner side of the frame 12).

The clutch 90 will be described hereinafter by using FIGS. 2 through 5.

Figure 2:
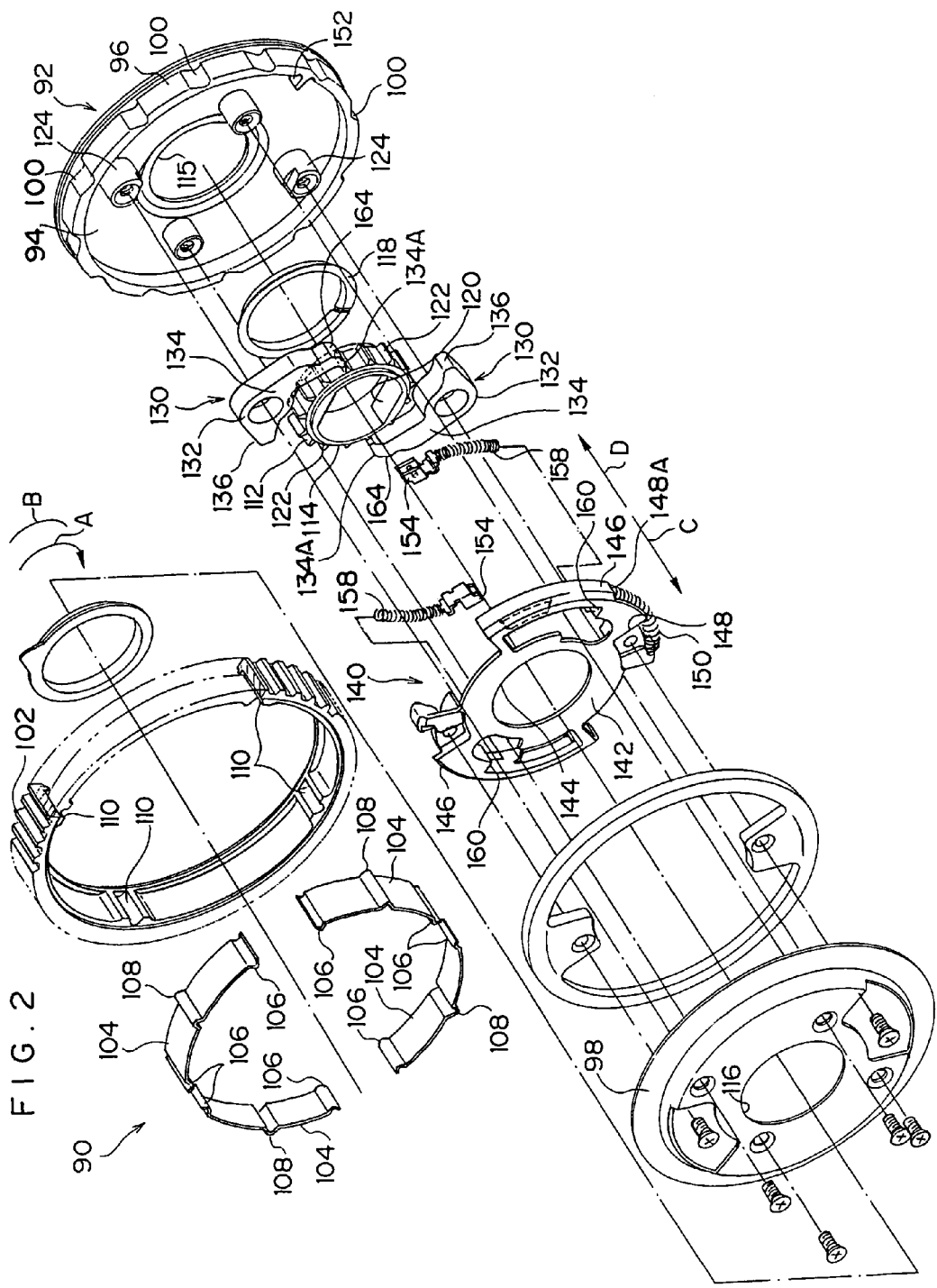
FIG. 2 is an exploded perspective view of a clutch of the webbing retractor relating to the first embodiment of the present invention.

As shown in FIG. 2, the clutch 90 has a base plate 92. The base plate 92 is formed in the shape of a hollow cylinder which has a bottom and whose axial direction dimension is extremely short (or in the shape of a shallow tray). A substantially ring-shaped peripheral wall 96 is formed along the outer peripheral portion of a disc-shaped base portion 94 of the base plate 92. A cover 98, which is shaped as a thin disc, is attached to the open end at one axial direction end side of the base plate 92 (the arrow C direction side in FIG. 2), such that the open end of the base plate 92 is basically closed.

Figure 3:
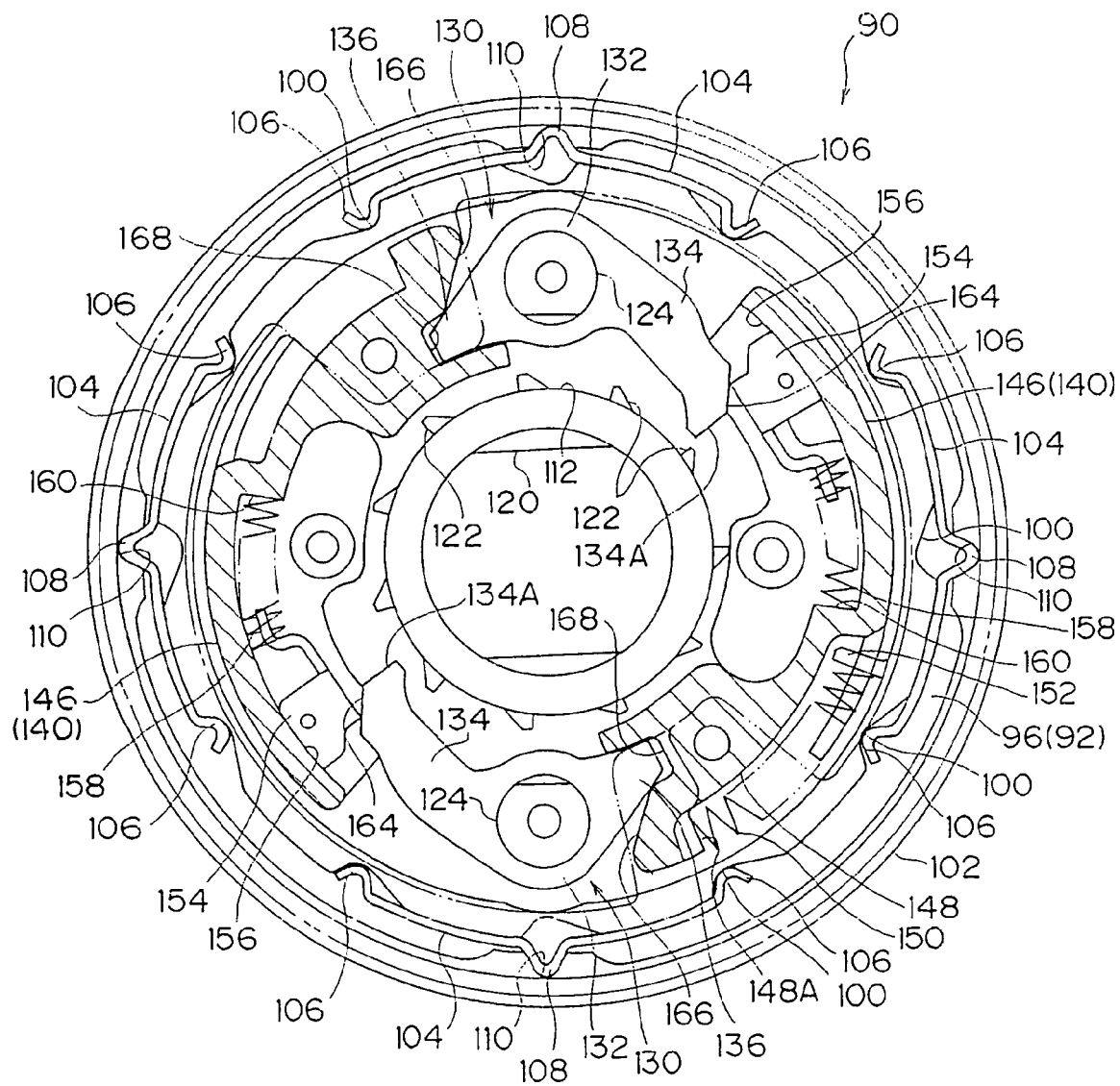
FIG. 3 is a side view showing the structure of the clutch.
Figure 4:
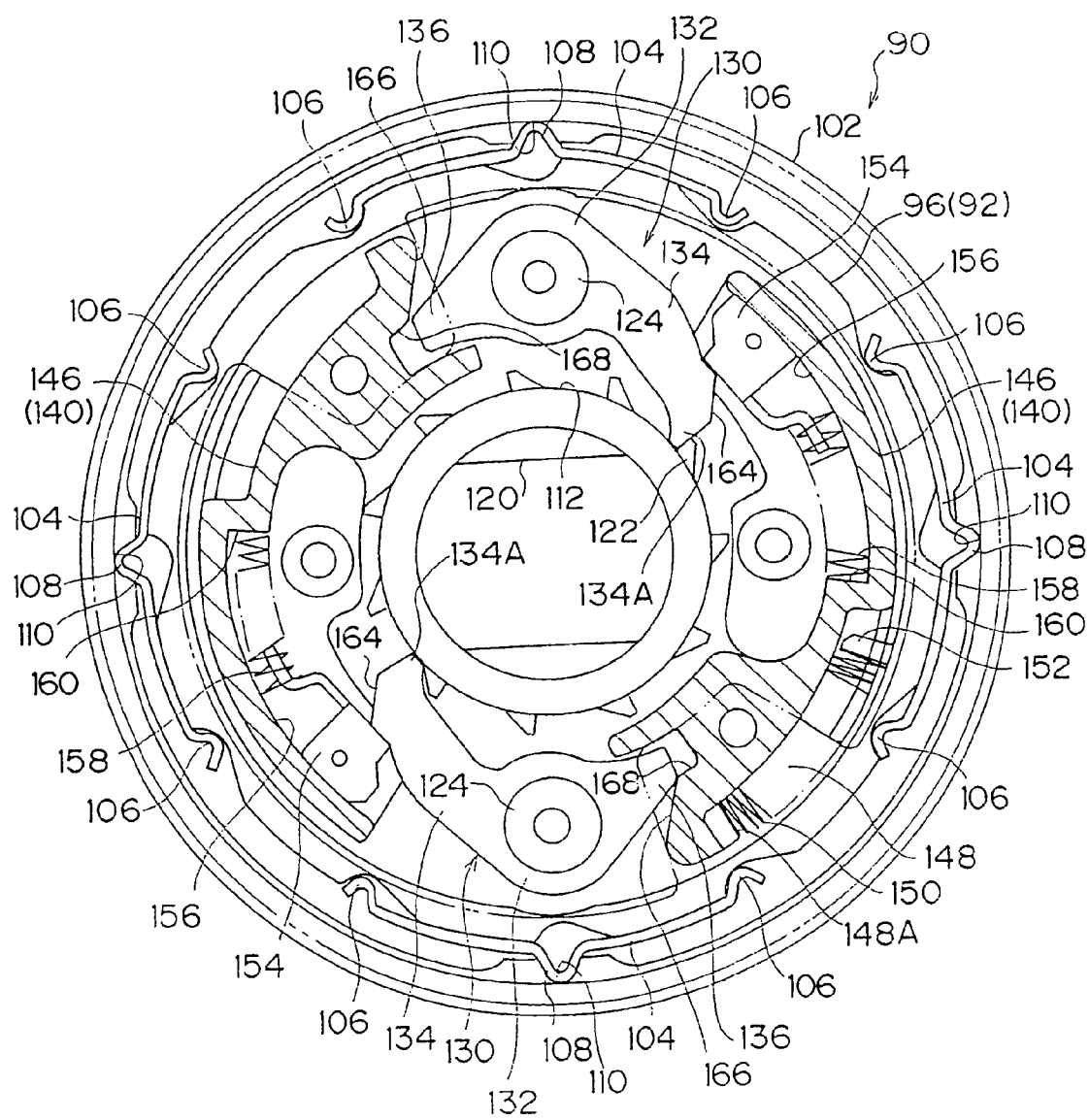
FIG. 4 is a side view corresponding to FIG. 3 and showing a state in which transmitting members are engaged with a second rotating body.
Figure 5:
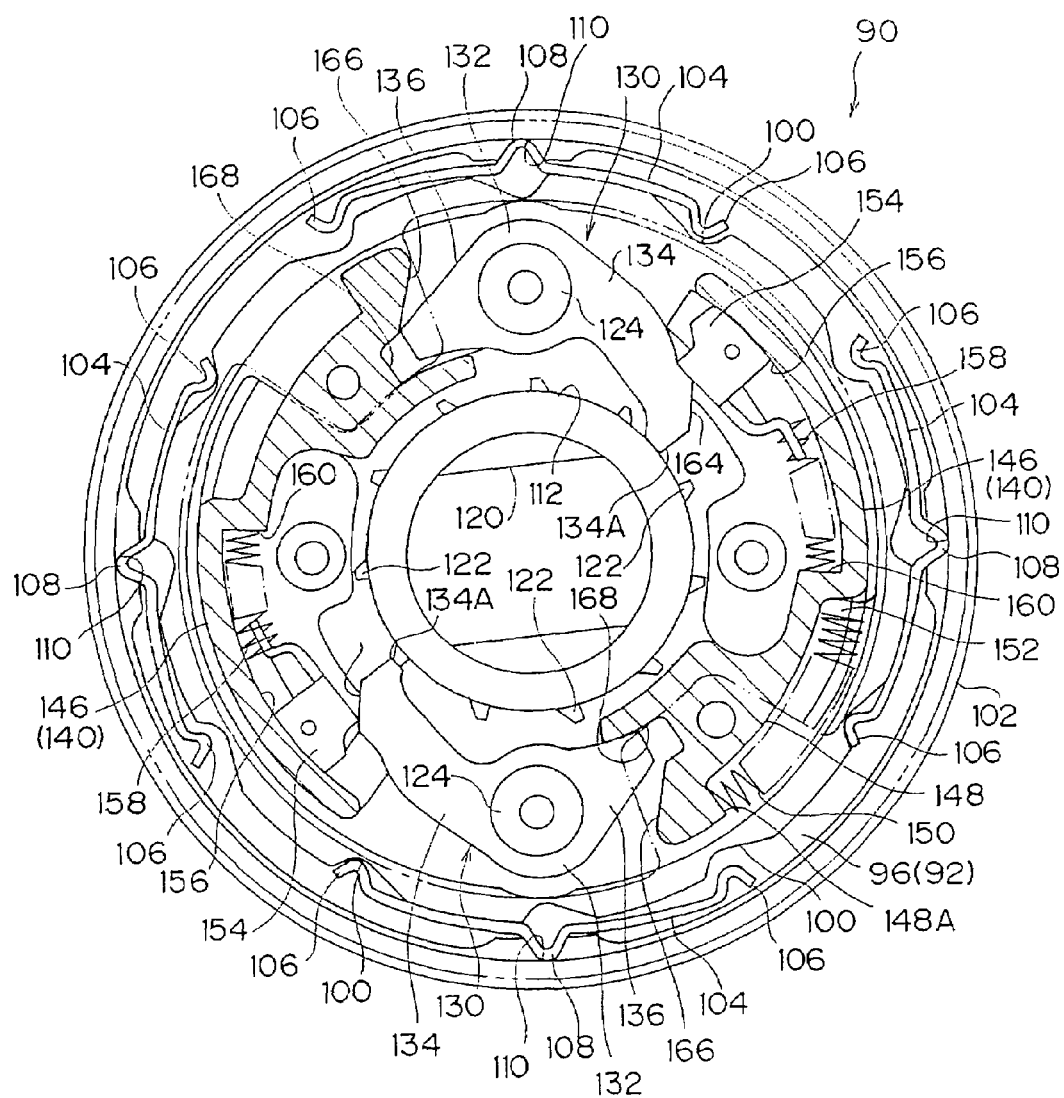
FIG. 5 is a side view corresponding to FIG. 3 and showing a state in which one transmitting member is riding on the addendum of an external tooth of the second rotating body.

Engaging recesses 100 are formed at uniform intervals along the peripheral direction in the outer peripheral portion of the peripheral wall 96. An external gear 102, which serves as a first rotating body, is provided at the outer side of the peripheral wall 96. The external gear 102 is formed substantially in the shape of a ring which has a number of teeth which is sufficiently larger than that of the gear 70, and is provided coaxially with respect to the base plate 92. The inner diameter of the external gear 102 is sufficiently larger than the outer diameter of the peripheral wall 96. An annular gap is formed between the inner peripheral portion of the external gear 102 and the outer peripheral portion of the peripheral wall 96. As shown in FIGS. 3 through 5, a plurality of torque limiters 104 are disposed in this annular gap, intermittently in the peripheral direction.

As shown in FIGS. 2 through 5, the torque limiter 104 is a metal piece which has a spring property, and which is shaped as a plate having a narrow width, and whose widthwise dimension is less than the axial direction dimension of the external gear 102. Engaging portions 106, which can enter into the engaging recesses 100, are formed at the both longitudinal direction ends of the torque limiter 104. Further, an engaging projection 108, which is bent as if to project out substantially in the direction opposite the direction of projection of the engaging portions 106, is formed substantially at the longitudinal direction center of the torque limiter 104.

Engaging recesses 110 are formed at the inner peripheral portion of the external gear 102 so as to correspond to the engaging projections 108. In the state in which the engaging projections 108 are in the engaging recesses 110, the engaging portions 106 are in the engaging recesses 100, and the base plate 92 and the external gear 102 are connected substantially integrally via the torque limiters 104. In this way, when the external gear 102 attempts to rotate relative to the base plate 92 around the axial center of the base plate 92, the torque limiters 104 of course also attempt to rotate integrally together with the external gear 102.

However, due to the engaging portions 106 of the torque limitters 104 being in the engaging recesses 100, when the engaging portions 106 attempt to rotate along the peripheral direction of the peripheral wall 96, the engaging recesses 100 interfere with the engaging portions 106 such that rotation of the engaging portions 106 is restricted. In this way, relative rotation of the external gear 102 with respect to the base plate 92 is restricted, and the external gear 102 and the base plate 92 are connected integrally.

However, as described above, because the torque limiters 104 are metal pieces having a spring property, if the torque generated by the relative rotation of the external gear 102 with respect to the base plate 92 is large enough to pull the engaging portions 106 out from the engaging recesses 100 against the spring forces (urging forces) of the torque limiters 104, the interference of the engaging recesses 100 with the engaging portions 106 is released. Therefore, relative rotation of the external gear 102 with respect to the base plate 92 becomes possible.

On the other hand, an adapter 112, which is substantially hollow cylindrical, is disposed substantially coaxially with the base plate 92 at the inner side of the base plate 92. On the whole, the axial direction other end (the arrow D direction side in FIG. 2) of the adapter 112 is pivotally supported at a circular hole 115 formed in the center of the base portion 94 (the base plate 92). A tubular portion 114, which is cylindrical and is formed coaxially at the other end of the adapter 112, is pivotally supported so as to be freely rotatable at a circular hole 116 formed in the cover 98.

A spacer 118, which is formed in a ring shape and of a synthetic resin material, is disposed between the adapter 112 and the base portion 94 of the base plate 92. The spacer 118 is pivotally supported by the tubular portion 114 of the adapter 112. One axial direction end surface of the spacer 118 abuts the base portion 94, whereas the other axial direction end surface abuts the end surface of the connecting portion where the main body portion of the adapter 112 is connected to the tubular portion 114.

A fit-together hole 120, which passes through along the axial direction of the adapter 112, is formed in the adapter 112. The other axial direction end of the spool 20 is fit into the fit-together hole 120, such that the adapter 112 and the spool 20 are connected together coaxially and integrally. Further, a plurality of external teeth 122, which is an odd number of teeth, are formed at uniform intervals at the outer peripheral portion of the adapter 112.

Moreover, a pair of bosses 124 are formed at the base portion 94 of the base plate 92 at the radial direction outer side of the adapter 112. Each boss 124 is formed as a substantially cylinder, and stands erect from the base portion 94 toward one side in the axial direction thereof. These bosses 124 are formed so as to oppose one another across the circular hole 115. A pawl 130 is provided at each boss 124.

The pawl 130 has a main body 132. The main body 132 is formed in the shape of a ring whose inner diameter is extremely slightly larger than the outer diameter of the boss 124. Due to the main body 132 being fit together with the boss 124 such that the boss 124 passes through the main body 132, the pawl 130 is pivotally supported so as to be freely rotatable around the boss 124.

A connecting piece 134 is formed at a portion of the outer periphery of the main body 132. Each of the connecting pieces 134 is formed such that, in the state in which the main body 132 is pivotally supported at the boss 124, the connecting piece 134 extends toward the take-up direction side of the spool 20 with respect to the main body 132. Moreover, each connecting piece 134 is formed such that, by being rotated by a predetermined angle in the take-up direction around the boss 124, a corner portion of a distal end 134A abuts the outer peripheral surface of the adapter 112 between the external tooth 122 and the external tooth 122 of the adapter 112.

The distal end 134A of the connecting piece 134 is formed as an inclined surface which is inclined so as to correspond to the pull-out direction side surfaces of the teeth of the adapter 112. Due to the distal end 134A abutting and interfering with the external tooth 122, rotation of the adapter 112 in the pull-out direction is restricted.

Here, as described above, the bosses 124 are formed so as to oppose one another across the circular hole 115. Therefore, in a state in which the corner portions of the distal ends 134A of the pawls 130 which have basically the same configurations contact the outer peripheral surface of the adapter 112, the distal end 134A of one of the pawls 130 is positioned, across the axial center of the adapter 112, at the opposite side of the distal end 134A of the other of the pawls 130. Accordingly, if the total number of the external teeth 122 formed at the outer peripheral portion of the adapter 112 is an even number and the external tooth 122 is formed at the opposite side, across the axial center of the adapter 112, of any of the external teeth 122, the distal ends 134A of the both pawls 130 both abut the external teeth 122.

However, as mentioned above, in the present embodiment, the total number of the external teeth 122 formed at the outer peripheral portion of the adapter 112 is an odd number. Thus, in the state in which the distal end 134A of the one pawl 130 is abutting the external tooth 122, the distal end 134A of the other pawl 130 has moved apart from the external tooth 122 along the peripheral direction of the adapter 112 (i.e., the distal end 134A of the other connecting piece 134 is not contacting the external tooth 122).

On the other hand, a releasing piece 136 extends from the outer peripheral portion of each of the main body 132. The releasing piece 136 is formed at the side of the main body 132 approximately opposite the side at which the connecting piece 134 is formed. The outer side surface of the releasing piece 136 is an inclined surface which inclines toward the radial direction outer side of the base plate 92, with respect to the pull-out direction. By rotating the releasing piece 136 in the pull-out direction, the connecting piece 134 rotates in the direction of moving away from the outer peripheral portion of the adapter 112.

Further, the clutch 90 is equipped with a rotating disc 140. The rotating disc 140 has a substantially plate-shaped base portion 142 whose direction of thickness runs along the axial directions of the base plate 92 and the adapter 112. A circular hole 144 is formed in the base portion 142. The inner diameter of the circular hole 144 is extremely slightly larger than the outer diameter of the tubular portion 114 formed coaxially with respect to the outer peripheral portion of the adapter 112 at the axial direction other end side of the adapter 112. By carrying out assembly by making the tubular portion 114 pass through the circular hole 144, the base portion 142, and thus, the rotating disc 140 are pivotally supported at the adapter 112 so as to freely rotate around the adapter 112.

Further, a pair of blocks 146 are formed at the base portion 94 side surface of the base portion 142. The blocks 146 are formed so as to oppose one another across the circular hole 144. One of the bosses 124 is positioned at one of the outer peripheral regions of the outer side of the circular hole 144, between the pair of blocks 146. The other boss 124 is positioned at the other outer peripheral region, which is at the side of the circular hole 144 opposite this position.

A spring accommodating portion 148 is formed at the outer peripheral portion of one of the pair of blocks 146 (the outer side surface of the block 146 which outer side surface runs along the radial direction of the circular hole 144). A compression coil spring 150 is accommodated in the spring accommodating portion 148.

The compression coil spring 150 is accommodated in the spring accommodating portion 148 in a state in which the compression coil spring 150 curves around the center of the circular hole 144. The take-up direction side end portion of the compression coil spring 150 abuts a wall portion 148A of the spring accommodating portion 148. The pull-out direction side end portion of the compression coil spring 150 abuts an abutment wall 152 which extends from the inner peripheral portion of the peripheral wall 96 of the base plate 92 and which enters into the spring accommodating portion 148.

The rotating disc 140 is pivotally supported so as to be freely rotatable at the tubular portion 114 of the adapter 112. Therefore, basically, the rotating disc 140 freely rotates relative not only to the adapter 112 but to the base plate 92 as well. However, as described above, the take-up direction side end portion of the compression coil spring 150 abuts the wall portion 148A of the spring accommodating portion 148, and the pull-out direction side end portion of the compression coil spring 150 abuts the abutment wall 152 of the base plate 92. Therefore, when the base plate 92 attempts to rotate in the take-up direction relative to the rotating disc 140, the abutment wall 152 pushes the rotating disc 140 in the take-up direction via the compression coil spring 150, and makes the rotating disc 140 rotate following the rotation of the base plate 92. Therefore, provided that torque, which is of magnitude which can resist the urging force of the compression coil spring 150, is not applied to the rotating plate 150, rotation of the base plate 92 in the take-up direction relative to the rotating disc 140 is limited.

A pushing piece 154 is provided at the inner peripheral portion of each block 146. The pushing pieces 154 are disposed at the take-up direction sides of the pawls 130, and are able to move relative to the blocks 146 (i.e., the rotating disc 140), along peripheral walls 156 which are formed at the blocks 146 so as to curve coaxially with respect to the circular hole 144. Moreover, a compression coil spring 158 is provided at the pushing piece 154 opposite the side at which the pawl 130 is located.

The compression coil spring 158 is disposed in a state of being curved along the peripheral wall 156. One end of the compression coil spring 158 is engaged to and connected with the end portion of the pushing piece 154 at the side opposite the side where the pawl 130 is provided. In contrast, a projection 162, which is formed so as to project toward the pushing piece 154 from an abutment wall 160 formed at the rotating disc 140 at the side opposite the pushing piece 154, is engaged to and connected with the other end of the compression coil spring 158 in a state in which this other end of the compression coil spring 158 abuts the abutment wall 160.

Inclined surfaces 164 are formed at the transverse direction outer ends of the connecting pieces 134 of the pawls 130, in correspondence with the pushing pieces 154. The inclined surface 164 is inclined toward the outer side in the radial direction of the base plate 92, with respect to the pull-out direction. In the state in which the distal end 134A is not contacting the outer peripheral portion of the adapter 112, the inclined surface 164 opposes the pushing piece 154 along the peripheral direction of the base plate 92 and the rotating disc 140.

The pushing piece 154 is formed so as to abut the inclined surface 164 due to the base plate 92 rotating by a predetermined amount in the take-up direction relative to the rotating disc 140. When, from this state of abutment, the base plate 92 attempts to rotate even further in the take-up direction relative to the rotating disc 140, the inclined surface 164 is pushed in the pull-out direction by the pushing piece 154. Due to this pushing force, the pawl 130 rotates in the take-up direction around the boss 124.

At the take-up direction side end portion of each block 146 which runs along the peripheral direction of the rotating disc 140, a pushing portion 166 is formed, and a releasing piece accommodating portion 168 is formed further toward the axial center of the rotating disc 140 than the pushing portion 166. The pushing portion 166 is formed so as to correspond to the releasing piece 136 of the pawl 130 along the peripheral direction of the rotating disc 140. The releasing piece 136 gradually curves toward the axial center of the base plate 92 from the portion thereof connected to the main body 132 (the proximal end portion thereof) toward the distal end side thereof. The transverse direction outer side surface of the releasing piece 136 as well is curved in a similar way.

Accordingly, when the base plate 92 rotates by a predetermined amount in the pull-out direction relative to the rotating disc 140, the pushing portions 166 abut the transverse direction outer side surfaces of the releasing pieces 136. In this state of abutment, when the base plate 92 rotates further in the pull-out direction relative to the rotating disc 140, the pushing portions 166 push the distal end portions of the releasing pieces 136 in the take-up direction. Here, the distal ends of the releasing pieces 136 are formed as inclined surfaces which are inclined toward the outer side in the radial direction of the rotating disc 140, with respect to the pull-out direction. Thus, due to the pushing portions 166 pushing the distal ends of the releasing pieces 136, the pushing portions 166 rotate the pawls 130 in the pull-out direction around the bosses 124 and guide the releasing pieces 136 to the releasing piece accommodating portions 168.

In the clutch 90 having the above-described structure, the external gear 102 meshes with the gear 70. Due to the driving force transmitting mechanism of the present embodiment, which is structured to include the gears 64, 66, 70, the torque of the output shaft 62, which rotates due to the driving force of the motor 60, is transmitted to the external gear 102 (the clutch 90).

On the other hand, as shown in FIG. 1, the motor 60 is electrically connected to a battery 78, which is provided in the vehicle, via a driver 76 which structures a control unit. Due to current from the battery 78 flowing to the motor 60 via the driver 76, the motor 60 is driven and rotates the output shaft 62. The driver 76 is connected to an ECU 80 which is structured by a microcomputer or the like and which structures the control unit. Furthermore, the ECU 80 is connected to a forward observation device 82 which serves as a forward observation mechanism.

The forward observation device 82 has an infrared sensor 84 which is provided in a vicinity of the front end portion of the vehicle. The infrared sensor 84 emits infrared rays toward the region in front of the vehicle, and receives the infrared rays which have been reflected by another vehicle or an obstacle which has stopped or is traveling in front of the vehicle. (Hereinafter, such objects, including other vehicles which are traveling or have stopped, will be called "obstacles" for convenience of explanation.)

The forward observation device 82 has a computing section 86. The computing section 86 computes the distance to the obstacle on the basis of the period of time from the time that the infrared rays are emitted from the infrared sensor 84 to the time that they return to the infrared sensor 84 after having been reflected at the obstacle. On the basis of the results of computation, the computing section 86 outputs an obstacle detection signal Os to the ECU 80. If the distance to the obstacle is a predetermined value or more, the obstacle detection signal Os is low level, whereas if the distance to the obstacle is less than the predetermined value, the obstacle detection signal Os is high level.

OPERATION AND EFFECTS OF FIRST EMBODIMENT

Next, the operation and effects of the present embodiment will be described by way of explaining the operation of the present webbing retractor 10.

In the present webbing retractor 10, in the state in which the webbing belt 28 is taken-up and accommodated in the form of a roll on the spool 20, when the webbing belt 28 is pulled while an unillustrated tongue plate is pulled, the webbing belt 28 is pulled out while the spool 20 is rotated in the pull-out direction against the urging force of the spiral spring 34 which urges the spool 20 in the take-up direction.

In this way, in the state in which the webbing belt 28 is pulled out, the vehicle occupant seated in a seat inserts the tongue plate in an unillustrated buckle device while pulling the webbing belt 28 around the front of his/her body, such that the tongue plate is held in the buckle device. The webbing belt 28 is thereby set in a state of being applied to the body of the vehicle occupant (hereinafter, this state will be referred to simply as the "applied state").

When the webbing belt 28 is pulled out and the spool 20 is rotated in the pull-out direction in order to apply the webbing belt 28 to the body of a vehicle occupant, the spiral spring 34 is wound tighter, such that the urging force of the spiral spring 34 which urges the spool 20 in the take-up direction increases. Accordingly, in the aforementioned applied state, the urging force of the spiral spring 34 works to make the webbing belt 28 be taken up on the spool 20. Thus, basically, the webbing belt 28 is fit to the body of the vehicle occupant due to this urging force, and the webbing belt 28 restrains and holds the body of the vehicle occupant by a force corresponding to the urging force at this time.

On the other hand, when holding of the tongue plate by the buckle device is released and the tongue plate comes out of the buckle device, the force for maintaining the webbing belt 28 in the state of being pulled-out against the urging force of the spiral spring 34 is cancelled. Thus, the spool 20 is rotated in the take-up direction by the urging force of the spiral spring 34. The webbing belt 28 which has been pulled out is taken-up in layers onto the outer peripheral portion of the spool 20 due to the rotation of the spool 20 in the take-up direction. In this way, the webbing belt 28 is accommodated.

Here, because the spool 20 is fit together with the adapter 112 of the clutch 90, when the spool 20 is rotated in order to pull-out or take-up the webbing belt 28, the adapter 112 rotates. However, as described above, because the clutch 90 does not transmit the rotation of the adapter 112 to the external gear 102, the external gear 102 does not rotate in this state.

Accordingly, the rotation of the spool 20 is not transmitted to the output shaft 62 of the motor 60 via the external gear 102 and the gears 70, 66, 64.

(Operation of Webbing Retractor 10 When Approaching an Obstacle Ahead)

On the other hand, while the vehicle is traveling, the computing section 86 computes the distance to an obstacle which is in front of the vehicle, on the basis of the results of detection of the infrared sensor 84 of the forward observation device 82. For example, if there is no obstacle in front of the vehicle or if there is an obstacle but the distance from the obstacle to the vehicle is a predetermined value or more, the low level signal Os is outputted from the computing section 86. On the other hand, when the distance from the vehicle to an obstacle ahead is less than a predetermined value, the high level signal Os is outputted from the computing section 86.

When the high level signal Os from the computing section 86 is inputted to the ECU 80, the ECU 80 outputs a predetermined operation signal to the driver 76. The driver 76, to which the operation signal in this state is inputted, causes current to flow to the motor 60 so as to drive the motor 60 such that the output shaft 62 is rotated suddenly.

The sudden rotation of the output shaft 62 is, while being decelerated via the gears 64 through 70, transmitted to the external gear 102 of the clutch 90, and suddenly rotates the external gear 102 in the take-up direction at a rotational speed which is a predetermined value or more. Because the external gear 102 is mechanically connected to the base plate 92 via the torque limiters 104, due to the external gear 102 rotating in the take-up direction, the base plate 92 rotates integrally and suddenly in the take-up direction.

Basically, when the base plate 92 rotates in the take-up direction, the abutment wall 152 pushes the pull-out direction side end portion of the compression coil spring 150, and the compression coil spring 150 pushes the wall portion 148A of the spring accommodating portion 148 by urging force. The rotating disc 140 thereby rotates so as to follow the base plate 92.

However, when the base plate 92 rotates suddenly in the take-up direction, because the rotating disc 140 attempts to remain at its position due to inertia, the rotating disc 140 cannot follow the rotation of the base plate 92. Relative rotation thereby arises between the base plate 92 and the rotating disc 140, and the base plate 92 rotates in the take-up direction with respect to the rotating disc 140.

In this way, when the base plate 92 rotates by a predetermined amount or more in the take-up direction relative to the rotating disc 140, the pushing pieces 154 formed at the blocks 146 of the rotating disc 140 abut the connecting pieces 134 of the pawls 130. In this state, when the base plate 92 attempts to rotate further in the take-up direction relative to the rotating disc 140, the pushing pieces 154 push the inclined surfaces 164 of the connecting pieces 134 in the pull-out direction.

The pushing forces applied to the inclined surfaces 164 act in the pull-out direction and toward the inner side in the radial direction of the rotating disc 140 and the base plate 92. The portions of the forces, which portions act toward the radial direction inner side, rotate the pawls 130 in the take-up direction around the bosses 124. Due to the pawls 130 rotating in the take-up direction around the bosses 124, as shown in FIG. 3, the corner portions of the distal ends 134A abut the outer peripheral portion of the adapter 112. In this state, the pawls 130 rotate together with the base plate 92 in the take-up direction around the center of the base plate 92, until the pawls 130 abut the external teeth 122 which are adjacent at the take-up direction sides.

Next, in this state, when the distal end 134A abuts the external tooth 122, and further, the base plate 92 rotates in the take-up direction, the distal end 134A of the pawl 130 pushes the external tooth 122 in the take-up direction, and rotates the adapter 112, and accordingly the spool 20, in the take-up direction. Due to this rotation of the spool 20, the webbing belt 28 is taken-up on the spool 20. In this way, the looseness (so-called "slack") in the webbing belt 28 is eliminated, and the ability of the webbing belt 28 to restrain the body of the vehicle occupant improves. Even if, thereafter, the vehicle occupant suddenly brakes and the vehicle suddenly decelerates, the webbing belt 28 reliably holds the body of the vehicle occupant.

In this way, when the motor 60 stops in the state in which the slack has been eliminated, rotation of the base plate 92 in the take-up direction stops. When rotation of the base plate 92 stops, the compression coil spring 150 pushes the rotating disc 140 in the take-up direction by urging force, so as to rotate the rotating disc 140 in the take-up direction. When the rotating disc 140 rotates, the pushing portions 166 abut the releasing pieces 136 of the pawls 130, and push the releasing pieces 136 in the take-up direction.

Due to the releasing pieces 136 receiving this pushing force, the pawls 130 rotate in the pull-out direction around the bosses 124, and as shown in FIG. 3, the distal ends 134A of the connecting pieces 134 move away from the outer peripheral portion of the adapter 112. In this way, the mechanical connection between the base plate 92 and the adapter 112, i.e., the mechanical connection between the output shaft 62 of the motor 60 and the compression coil spring 150, is released.

Here, in the present embodiment, as described above, the total number of the external teeth 122 of the adapter 112 is an odd number. In the state in which the distal end 134A of one of the pawls 130 is abutting the external tooth 122, the distal end 134A of the other pawl 130 is apart from the external tooth 122 along the peripheral direction of the adapter 112, and is positioned at an intermediate portion between the external tooth 122, which is adjacent in the take-up direction along the peripheral direction of the adapter 112, and the external tooth 122 which is adjacent in the pull-out direction.

Namely, in the present embodiment, in the state in which the distal ends 134A of the both pawls 130 abut the outer peripheral portion of the adapter 112, the interval from the distal end 134A of one of the pawls 130 to the distal end 134A of the other of the pawls 130 is not an integer multiple of the pitch of the external teeth 122. Thus, as shown in FIG. 4, even if the distal end 134A of one of the pawls 130 abuts the top land of the external tooth 122 at the time when the both pawls 130 are rotating around the bosses 124, the distal end of the other of the pawls 130 does not abut the top land of the external tooth 122, and abuts the outer peripheral portion of the adapter 112 between the external teeth 122 which are adjacent in the peripheral direction.

Accordingly, even if it is not possible for the distal end 134A of one of the pawls 130 to abut and mesh with the top land of the external tooth 122, the distal end 134A of the other of the pawls 130 reliably meshes with the external tooth 122 if the base plate 92 rotates by substantially one-half of the pitch of the external teeth 122. Thus, the rotation of the base plate 92 can reliably and quickly be transmitted to the adapter 112, and the torque of the motor 60 can be transmitted to the spool 20.

Moreover, in the state in which the distal end 134A of one of the pawls 130 abuts the addendum of the external tooth 122, the connecting piece 134 abuts the pushing piece 154 in this state as is. Here, even if the pushing piece 154 is integral with the rotating disc 140, further rotation of the base plate 92 in the take-up direction relative to the rotating disc 140 is restricted. In this state, because the interference of the pushing piece 154 with the distal end of the other of the pawls 130 is insufficient, the pushing piece 154 cannot rotate the other pawl 130 sufficiently in the take-up direction. As a result, there is the possibility that the distal end of the other pawl 130 cannot abut the external tooth 122.

Here, in the present embodiment, as described above, with the distal end 134A of the one pawl 130 abutting the addendum of the external tooth 122, the connecting piece 134 abuts the pushing piece 154. In this state, when the base plate 92 attempts to rotate further in the take-up direction relative to the rotating disc 140, as shown in FIG. 4, the distal end 134A of the pawl 130 pushes the pushing piece 154 and displaces the pushing piece 154 in the take-up direction, against the urging force of the compression coil spring 158. In this way, the base plate 92 rotates in the take-up direction relative to the rotating disc 140.

Thus, the pushing piece 154 corresponding to the other pawl 130 interferes with the distal end 134A of the other pawl 130, and rotates the pawl 130 in the take-up direction. In this way, even if the connecting piece 134 abuts the pushing piece 154 in a state in which the distal end 134A of the one pawl 130 abuts the addendum of the external tooth 122, the other pawl 130 can be made to mesh with the external tooth 122 of the adapter 112, and the rotation of the base plate 92 can be reliably transmitted to the adapter 112.

On the other hand, as described above, by rotating the spool 20 in the take-up direction by the torque of the motor 60, the force by which the webbing belt 28 restrains the body of the vehicle occupant is improved. However, in the state in which the webbing belt 28 is wound on the spool 20, until the slack is eliminated the body of the vehicle occupant is an obstacle, and the webbing belt 28 basically cannot be taken up any further on the spool 20. In this state, if the spool 20 attempts to rotate further in the take-up direction and take up the webbing belt 28, the webbing belt 28 is tightened against the body of the vehicle occupant by a force which is greater than needed, which is not preferable.

Here, as described above, if the spool 20 attempts to take-up the webbing belt 28 any more than needed, the body of the vehicle occupant is an obstacle to the taking-up of the webbing belt 28. Tensile force of a magnitude corresponding to the take-up force for the spool 20 to take the webbing belt 28 up is applied to the webbing belt 28 from the body of the vehicle occupant. This tensile force acts opposite to the direction in which the spool 20 takes up the webbing belt 28. Thus, the spool 20 is stopped due to this tensile force being applied to the webbing belt 28.

In this state, the torque of the motor 60 is applied to the spool 20 via the external gear 102, the base plate 92, the pawls 130 and the adapter 112. Thus, in the state in which the spool 20 is stopped, the external teeth 122 of the adapter 112 restrict rotation of the pawls 130 around the center of the base plate 92, and the pawls 130 restrict rotation of the base plate 92 in the take-up direction. Moreover, via the torque limiters 104, the base plate 92 restricts rotation of the external gear 102 in the take-up direction.

Here, in this state in which the rotation of the external gear 102 is limited by the base plate 92 via the torque limiters 104, if the external gear 102 attempts to rotate further in the take-up direction and the torque at this time exceeds the spring force of the torque limiters 104, the engaging portions 106 of the torque limiters 104 come out from the engaging recesses 100. In this way, the connection between the base plate 92 and the external gear 102 is temporarily cancelled, and only the external gear 102 rotates in the take-up direction until the engaging portions 106 enter into the other, adjacent engaging recesses 100.

In this way, due to the connection between the base plate 92 and the external gear 102 being cancelled, the transmission of the torque of the external gear 102 to the base plate 92, i.e., the transmission of the torque of the motor 60 to the spool 20, is cut-off. Thus, an increase in the restraining force applied by the webbing belt 28 can be suppressed.

As described above, the clutch 90 used in the present webbing retractor 10 not only has the function of transmitting torque, but also can cut-off the transmission of torque by the torque limiters 104 when an excessive torque is applied. Regardless of the fact that the above-described effects can be obtained, the widthwise dimension of the torque limiters 104 (the dimension thereof along the axial direction of the external gear 102) is less than the axial direction dimension of the external gear 102. The rotating disc 140 and the torque limiters 104 are therefore all disposed between the peripheral wall 96 of the base plate 92 and the external gear 102 along the radial direction of the external gear 102.

Moreover, members such as the pawls 130, the rotating disc 140 and the like as well are disposed between the peripheral wall 96 and the adapter 112 along the radial direction of the peripheral wall 96. These members are accommodated at the inner side of the external gear 102. Thus, the thickness dimension (the axial direction dimension) of the clutch 90 is substantially the axial direction dimension of the external gear 102, and is extremely thin.

In this way, because the clutch 90 having the torque limiters 104 can be made to be thin, the present webbing retractor 10 can be made compact.

Moreover, in the present webbing retractor 10, the clutch 90 is provided coaxially with respect to the spool 20, between the leg plate 16 and the leg plate 18 of the frame 12. Therefore, the adapter 112 (i.e., the clutch 90) can be directly connected to the spool 20. In this way, the torque of the adapter 112, which arises due to the driving force of the motor 60 being transmitted indirectly, can be transmitted to the spool 20 extremely smoothly, and the spool 20 can be smoothly rotated in the take-up direction.

By disposing the clutch 90 between the leg plate 16 and the leg plate 18 of the frame 12 as described above, as shown in FIG. 1, the motor 60 and the gears 64 through 70, which structure the driving force transmitting mechanism, can be placed between the leg plate 16 and the leg plate 18 of the frame 12. As a result, the webbing retractor 10 can be made to be compact as compared with a structure in which the motor 60 and the gears 64 through 70 are disposed at the outer side of the frame 12.

In addition, as compared with a structure in which the motor 60 and the gears 64 through 70 are disposed at the outer side of the frame 12, the motor 60 and the gears 64 through 70 can be positioned toward the center in the direction in which the leg plates 16, 18 face one another, as described above. Therefore, the overall balance of weight of the webbing retractor 10 can be set toward the center in the direction in which the leg plates 16, 18 face one another, and the webbing retractor 10 can be made stable in terms of the weight thereof.

By placing the clutch 90 between the leg plates 16, 18, the motor 60 can be disposed between the leg plates 16, 18. Therefore, the motor 60 and the clutch 90 can be set at positions which are relatively close to one another. The structure of the decelerating mechanism such as the gears 64 through 70 can thereby be simplified. In this way as well, the webbing retractor 10 can be made to be compact, and the cost thereof can be reduced.

By disposing parts which are relatively heavy, such as the motor 60, between the leg plate 16 and the leg plate 18, it is possible to, as needed, support the motor 60 not only at the leg plate 16, but also at the back plate 14 or the leg plate 18 as well. In this way, there is no particular need to improve strength in order to support the motor 60. As a result, the webbing retractor 10 can be made to be more light-weight, and the cost thereof can be reduced.

Similarly, because the gears 64 through 70 can be disposed between the leg plates 16, 18, the supporting plate 68 can be supported, as needed, not only by the leg plate 16 but also by the back plate 14. For this reason as well, there is no particular need to improve strength, and as a result, the webbing retractor 10 can be made to be more light-weight, and the cost thereof can be reduced.

SECOND EMBODIMENT

Next, a second embodiment of the present invention will be described. In the description of the present embodiment, regions which are basically the same as those in the above-described first embodiment are denoted by the same reference numerals, and description thereof is omitted. Further, the present embodiment is a modified example of the driving force transmitting mechanism from the motor 60 to the external gear 102 of the clutch 90, and the other regions are the same as those of the above-described first embodiment. Therefore, description of regions other than the driving force transmitting mechanism will be omitted.

Figure 6:
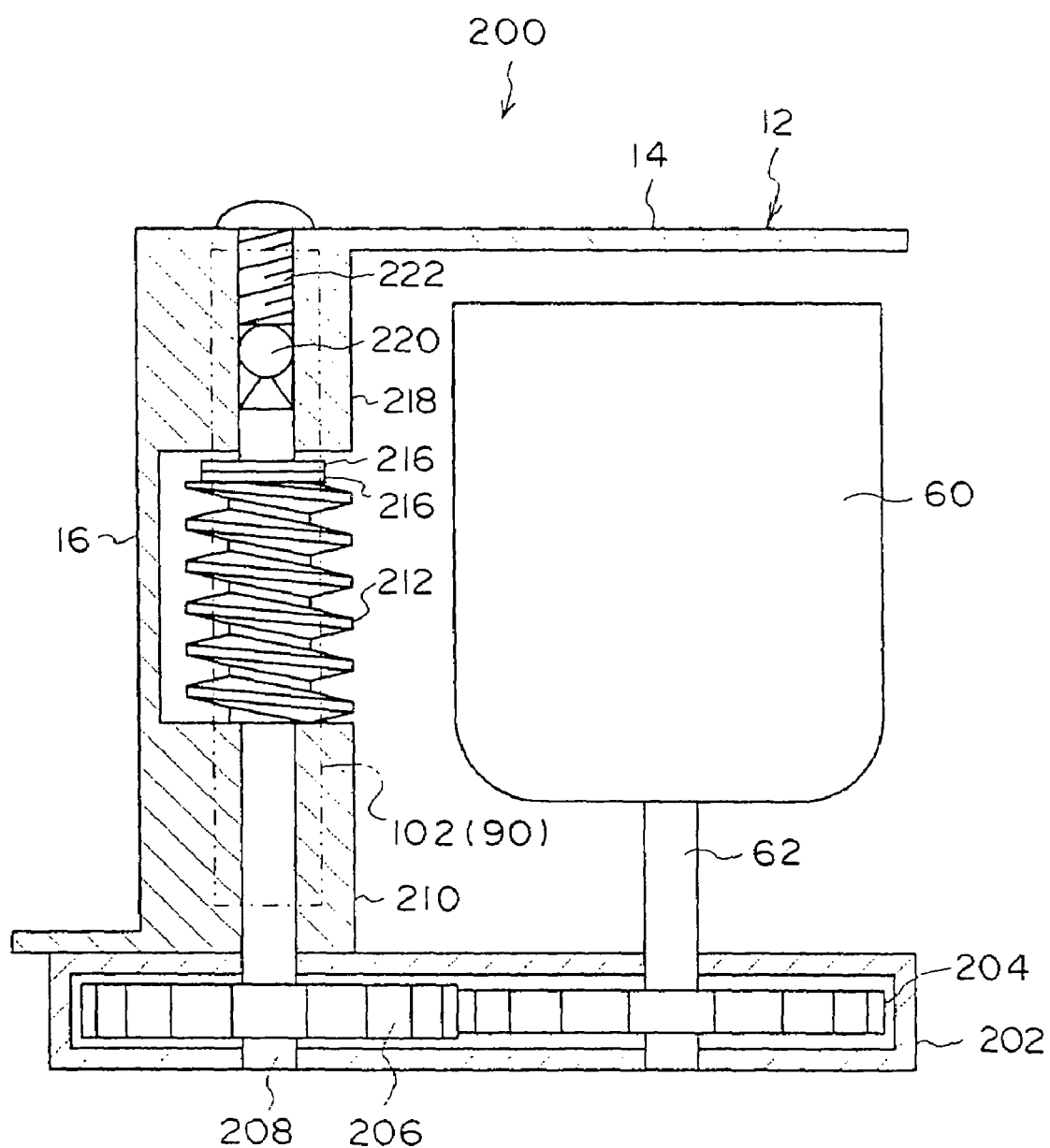
FIG. 6 is a plan sectional view summarily showing the structure of main portions of a webbing retractor relating to a second embodiment of the present invention.
Figure 7:
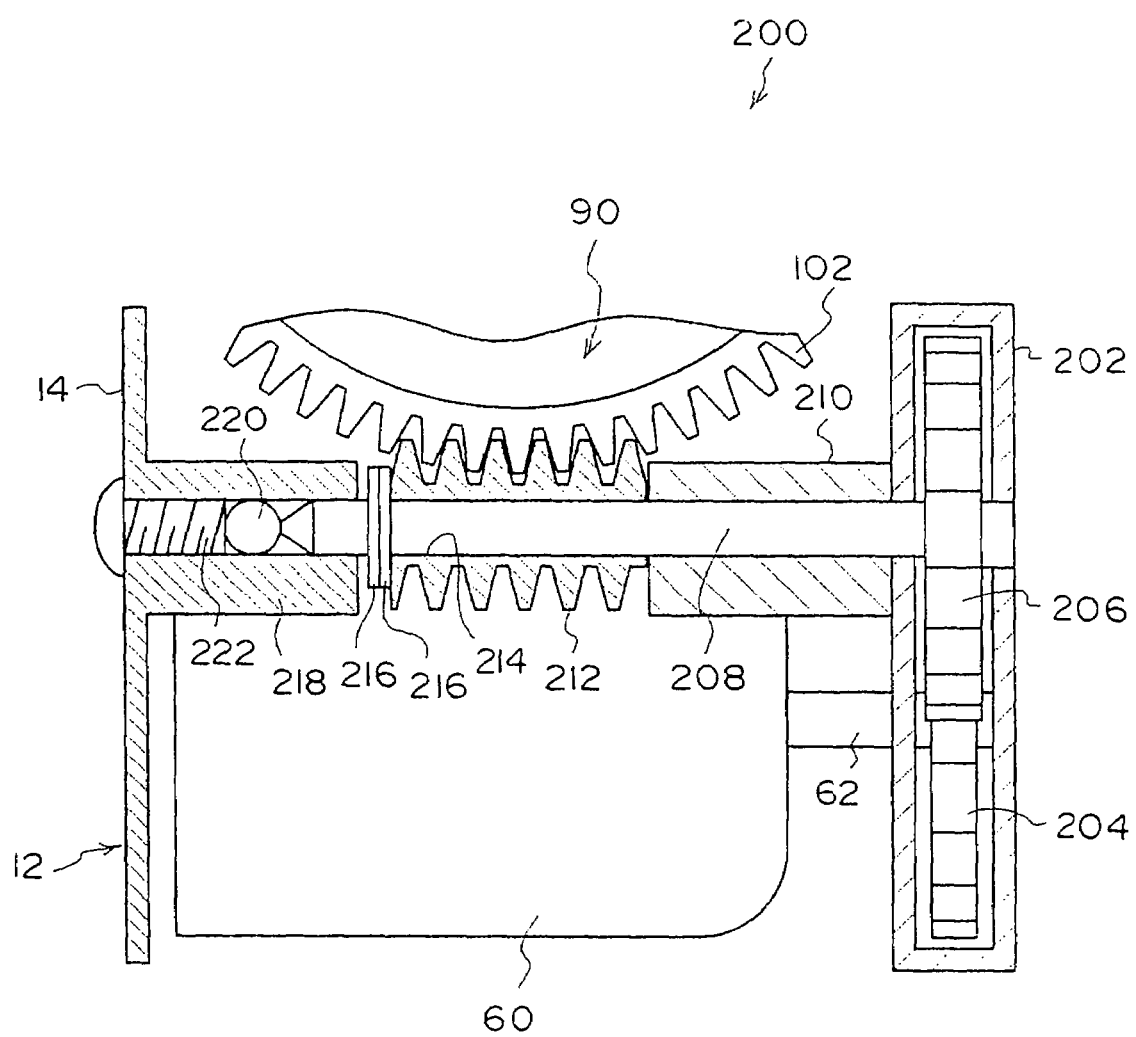
FIG. 7 is a side sectional view summarily showing the structure of the main portions of the webbing retractor relating to the second embodiment of the present invention.

The structure of main portions of a webbing retractor 200 relating to the present embodiment is shown in FIG. 6 in a plan sectional view. The structure of the main portions of the webbing retractor 200 is shown by a side sectional view in FIG. 7.

As shown in these figures, the present webbing retractor 200 has a gear housing 202. The gear housing 202 is fixed integrally to the frame 12 in the open portion at the side opposite the back plate 14 of the frame 12 by fasteners such as screws or the like. The distal end side of the output shaft 62 of the motor 60 is supported by the gear housing 202 so as to be freely rotatable.

A pair of gears 204, 206, which structure the driving force transmitting mechanism and each of which is a spur gear having external teeth, are accommodated at the interior of the gear housing 202 in a state of meshing with one another. The gear 204, which serves as the output shaft side rotating member or the output shaft side gear, is connected to the output shaft 62 integrally, coaxially, and attachably to and detachably from. On the other hand, the gear 206, whose pitch circle is larger than and whose number of teeth is greater than that of the gear 204 and which serves as a clutch side rotating member or a clutch side gear, is connected integrally, coaxially, and attachably to and detachably from a shaft 208 whose axial direction is parallel to the output shaft 62.

The shaft 208 projects from the gear housing 202, and the distal end side thereof passes through a bearing 210 which is formed integrally with the leg plate 16. A worm gear 212 is disposed coaxially with respect to the shaft 208 at the side of the bearing 210 opposite the side at which the gear housing 202 is disposed. A through hole 214 is formed in the axially central portion of the worm gear 212. The shaft 208 is connected integrally to the worm gear 212 with respect to the direction around the axis thereof, in a state in which the shaft 208 passes through the through hole 214.

The external teeth 102 of the clutch 90 mesh with the worm gear 212. Note that, in the present embodiment, the teeth of the external gear 102 which mesh with the worm gear 212 are of course not an ordinary spur gear, but are a worm wheel.

One or plural E rings 216 are fixed at the side of the worm gear 212 opposite the side at which the bearing 210 is disposed, and restrict displacement of the worm gear 212 along the axial direction of the shaft 208.

A bearing 218 is provided at the side of the E ring(s) 216 opposite the side at which the worm gear 212 is provided. The bearing 218 is substantially tubular. The end portion of the bearing 218 at the side opposite the worm gear 212 is connected integrally to the back plate 14. A steel sphere 220 is accommodated within the bearing 218. The outer diameter of the steel sphere 220 is extremely slightly smaller than the inner diameter of the bearing 218. The steel sphere 220 contacts the tapered distal end portion of the shaft 208.

A female screw is formed at the inner peripheral portion of the bearing 218 at the side of the steel sphere 220 opposite the side where the shaft 208 is located. An adjustment screw 222 is screwed in with this female screw from an open end at the back plate 14 side. Due to the distal end portion of the adjustment screw 222 pushing the steel sphere 220, the steel sphere 220 press-contacts the distal end of the shaft 208. Axial direction displacement of the shaft 208 is thereby restricted.

In the present embodiment having the above-described structure, the driving force of the motor 60 is transmitted to the gear 204 via the output shaft 62, and rotates the gear 204. The rotation of the gear 204 is transmitted to the gear 206 which meshes with the gear 204, is decelerated at the gear 206, and is transmitted to the shaft 208. Due to the shaft 208 rotating, the worm gear 212 rotates. The rotation of the worm gear 212 is transmitted to the external gear 102 of the clutch 90 which is a worm wheel.

As described above, in the present embodiment, the driving force of the motor 60 is transmitted to the external gear 102 of the clutch 90. However, here, the combination of the worm gear and the worm wheel has a reduction ratio which generally is extremely large as compared with that of a spur gear. Therefore, the driving force of the motor 60 can be decelerated greatly and can be transmitted to the external gear 102 of the clutch 90 even without using a large number of gears.

Moreover, in the present embodiment, as described above, the gear 204 can be attached to and detached from the output shaft 62, and the gear 206 can be attached to and detached from the shaft 208. Therefore, the overall reduction ratio can be appropriately changed by appropriately making the radii of the pitch circles and the numbers of teeth differ to the extent that the gears 204, 206 can mesh with one another.

Note that, in the present embodiment, the structure for transmitting the rotation of the output shaft 62 to the shaft 208, i.e., the driving force transmitting mechanism, is structured by the gears 204, 206. However, in place of the gears 204, 206, it is possible to use a pair of pulleys around which an endless belt is trained. In this way, there is the advantage that, in switching from the gears 204, 206 to belt transmission by pulleys, it suffices to merely replace the gears 204, 206 by pulleys.

As described above, in the webbing retractor relating to the present invention, regardless of the fact that the spool can be rotated by a driving mechanism such as a motor or the like, the device can be made compact overall, and further, the balance of weight of the overall device can be improved.

What is claimed is:

1. A webbing retractor for an elongated, strip-shaped webbing belt used for application to a body of a vehicle occupant riding in a vehicle, the webbing retractor comprising:

a frame including only two leg plates, which are disposed so as to face one another, and are connected by a back plate so as to be integral;

a spool, which is disposed between the leg plates such that said leg plates bear a rotational load of said spool, and held directly or indirectly to the frame so as to be rotatable around an axis, one end of the webbing belt being anchored to the spool, the spool being for winding of the webbing belt therearound such that the webbing is disposed between the two leg plates;

a driving mechanism including a gear train, which is disposed between the leg plates and can be used repeatedly, said driving mechanism having an output shaft which is for rotating the spool in at least a take-up direction by driving the output shaft to rotate in a predetermined direction;

a clutch disposed entirely between the leg plates, and mechanically interposed between the output shaft and the spool, for transmitting rotation of the output shaft to the spool;

a spiral spring that applies an urging force to the spool in the take-up direction, and a support member connected to said frame and disposed between said leg plates, wherein the entire clutch is disposed directly adjacent to a side of one of the leg plates facing the other of the leg plates, and the spiral spring is disposed at a side of said one of the leg plates which is opposite to a side of said one leg plate that faces the other of the leg plates, and wherein gears of said gear train are rotationally mounted between said one leg plate and said support member.

2. The webbing retractor of claim 1, wherein the spool is disposed between the pair of leg plates in a state such that an axial direction thereof runs along a direction in which the pair of leg plates face one another.

3. The webbing retractor of claim 2, wherein the clutch is a clutch which can cut-off transmission of rotation arising at a spool side and thereby prevent transmission of said rotation to the output shaft.

4. The webbing retractor of claim 3, wherein the clutch has a first rotating body which rotates due to rotation of the output shaft; a second rotating body which is provided coaxially and integrally with the spool, and which is for transmitting rotation to the spool by receiving rotation of the first rotating body; and a transmitting member transmitting the rotation of the first rotating body to the second rotating body.

5. The webbing retractor of claim 4, wherein the second rotating body is formed in a hollow cylindrical shape and comprises a plurality of external teeth at the outer peripheral portion.

6. The webbing retractor of claim 5, wherein the transmitting member engages with the external teeth of the second rotating body when transmitting the rotation of the first rotating body to the second rotating body.

7. The webbing retractor of claim 4, wherein the transmitting member is a transmitting member which is provided so as to be able to approach and move away from one rotating body among the first rotating body and the second rotating body and so as to be able to rotate integrally together with another rotating body among the first rotating body and the second rotating body, and which, due to the rotation of the first rotating body, approaches the one rotating body and mechanically engages with the one rotating body.

8. The webbing retractor of claim 1, wherein balance of a weight of the webbing retractor can be achieved around a center in the direction in which the leg plates face one another.

9. The webbing retractor of claim 1, wherein said driving mechanism is supported by at least one of the pair of leg plates and the back plate.

10. The webbing retractor of claim 1, wherein said spool has opposing ends which are rotatably mounted in said leg plates.

11. The webbing retractor of claim 1, wherein a center of mass of said webbing retractor is disposed between said leg plates.

12. The webbing retractor of claim 10, wherein said leg plates are parallel to one another and have parallel edges that are substantially the same length.

13. The webbing retractor of claim 1, wherein said driving mechanism includes an electric motor.

14. The webbing retractor of claim 1, wherein the spiral spring is connected to a casing which in turn is directly connected to said one leg plate 15. A webbing retractor for an elongated, strip-shaped webbing belt used for application to a body of a vehicle occupant riding in a vehicle, the webbing retractor comprising:
- a frame including only two leg plates, which are disposed so as to face one another, and are connected by a back plate so as to be integral;
- a spool, which is disposed between the two leg plates and having opposing ends that are rotatably mounted in said two leg plates such that said leg plates bear the rotational load of said spool, one end of the webbing belt being anchored to the spool, the spool being for winding of the webbing belt therearound;
- a driving mechanism, which is disposed entirely between the two leg plates, said driving mechanism having a motor and an output shaft, and a gear train interposed between said output shaft and said spool which rotates the spool in at least a take-up direction when the output shaft is driven by said motor;
- a clutch disposed entirely between the leg plates and mechanically interposed between the output shaft and the spool, for transmitting rotation of the output shaft to the spool;
- a spiral spring that applies an urging force to the spool in the take-up direction, and
- a support member connected to said frame and disposed between said leg plates,
- wherein the output shaft of the driving mechanism is disposed parallel to the rotation axis of the spool, the entire clutch is disposed directly adjacent to a side of one of the leg plates facing the other of the leg plates, and the spiral spring is disposed at the side of said one of the leg plates which is opposite to a side of said one leg plate that faces the other of the leg plates, and
- wherein gears of said gear train are rotationally mounted between said one leg plate and said support member.

16. The webbing retractor of claim 15, wherein the spiral spring is connected to a casing which in turn is directly connected to said one leg plate.

* * * * *